(12) United States Patent
Kiyoshita

(10) Patent No.: US 11,186,320 B2
(45) Date of Patent: Nov. 30, 2021

(54) UPPER BODY STRUCTURE OF VEHICLE

(71) Applicant: Mazda Motor Corporation, Hiroshima (JP)

(72) Inventor: Daisuke Kiyoshita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/819,185

(22) Filed: Mar. 16, 2020

(65) Prior Publication Data

US 2020/0391802 A1 Dec. 17, 2020

(30) Foreign Application Priority Data

Jun. 17, 2019 (JP) .............................. JP2019-111741

(51) Int. Cl.
| | | |
|---|---|---|
| *B62D 25/02* | (2006.01) | |
| *B62D 25/06* | (2006.01) | |
| *B62D 25/04* | (2006.01) | |
| *B62D 27/02* | (2006.01) | |

(52) U.S. Cl.
CPC .......... *B62D 25/02* (2013.01); *B62D 25/025* (2013.01); *B62D 25/04* (2013.01); *B62D 25/06* (2013.01); *B62D 27/02* (2013.01)

(58) Field of Classification Search
CPC ........ B62D 25/02; B62D 25/04; B62D 25/06; B62D 27/02; B62D 27/023; B62D 21/157

USPC .............................. 296/203.01, 203.03, 210
See application file for complete search history.

(56) References Cited

U.S. PATENT DOCUMENTS

| | | | | |
|---|---|---|---|---|
| 7,810,871 | B2 * | 10/2010 | Matsui ................ | B62D 21/157 296/187.12 |
| 2012/0126582 | A1 * | 5/2012 | Kishi .................... | B62D 25/06 296/203.01 |
| 2012/0153676 | A1 * | 6/2012 | Shono ................... | B62D 25/04 296/193.06 |
| 2013/0320716 | A1 * | 12/2013 | Nishimura ............ | B62D 25/06 296/210 |

FOREIGN PATENT DOCUMENTS

JP 5548687 B2 7/2014

* cited by examiner

*Primary Examiner* — Dennis H Redder
(74) *Attorney, Agent, or Firm* — Xsensus LLP

(57) ABSTRACT

An upper body structure includes a pair of left and right roof side rails coupled to respective ends of a roof panel in a vehicle width direction and extending in a vehicle front-rear direction and a roof reinforcement 30 configured to couple intermediate portions in the vehicle width direction of the pair of roof side rails. A vehicle-width-direction inner side end of each roof side rail has a concave-convex shape in a side view along the vehicle front-rear direction, a vehicle-width-direction outer side end of the roof reinforcement has a concave-convex shape in the side view, and the concave-convex shaped end of each roof side rail and the concave-convex shaped end of the roof reinforcement 30 intersect each other in the side view.

4 Claims, 6 Drawing Sheets

UPPER BODY STRUCTURE OF VEHICLE

CROSS-REFERENCE TO RELATED APPLICATION

The present application claims priority to JP 2019-111741, filed Jun. 17, 2019, the entire contents of which are incorporated herein by reference.

BACKGROUND

Field

The present disclosure relates to an upper body structure of a vehicle including a pair of left and right roof side rails and a roof reinforcement coupling intermediate portions in a vehicle front-rear direction of the pair of roof side rails in a vehicle width direction.

Description of the Related Art

A related art upper body structure of a vehicle includes: a pair of left and right roof side rails coupled to respective ends of a roof panel in a vehicle width direction and extending in a vehicle front-rear direction; a pair of left and right center pillars extending downward in an up-down direction from respective intermediate portions of the pair of roof side rails; a roof reinforcement coupling intermediate portions in the vehicle front-rear direction of the pair of roof side rails in the vehicle width direction; and a pair of left and right gussets providing reinforcement between the roof reinforcement and each of the pair of center pillars.

One such upper body structure includes a roof side rail including a roof rail outer (roof side stiffener) and a roof rail inner that, jointly with the roof rail outer, defines a closed cross-section extending in the front-rear direction. The upper body structure also includes: a tongue piece formed at left and right ends of a roof reinforcement (roof arch) and joined to an upper surface of the roof rail outer on the vehicle-width-direction inner side end of the roof rail outer; and a gusset tightened and fixed to the roof rail inner and the roof reinforcement with bolts. The above configuration allows a collision load input to a center pillar to be dispersed and transmitted on two paths, namely one going from the center pillar through the roof rail outer to the roof reinforcement, and one going from the center pillar through the gusset to the roof reinforcement. This can prevent a sectional collapse of the roof side rail and helps reduce the size of components.

To ensure safety of occupants in the event of a side collision of a vehicle, various techniques have been proposed to restrain pillar members from deforming toward the vehicle-width-direction inner side, an example of which is shown in FIG. 10.

As shown in FIG. 10, a center pillar 53 coupling a roof side rail 51 and a side sill 52 may be structured such that bending rigidity of its upper member corresponding to about two thirds from the upper end of the center pillar 53 is larger than bending rigidity of its lower member corresponding to about one third from the lower end of the center pillar 53. This can make a bending deformation angle of the lower member larger than that of the upper member, reducing the maximum displacement of the center pillar 53 toward the vehicle-width-direction inner side.

As shown in FIG. 10, in response a collision load toward the vehicle vehicle-width-direction inner side being input to the center pillar 53 in the event of a side collision of the vehicle, the center pillar 53 may be displaced and consequently the roof side rail 51 may receive a force toward the vehicle-width-direction inner side and toward the lower side in a vehicle up-down direction. This may result in the roof side rail 51 being displaced toward the inner lower side in the vehicle width direction. This means that reducing the displacement of the roof side rail 51 toward the vehicle-width-direction inner side may help restrain the center pillar 53 from moving toward the vehicle-width-direction inner side.

Thus, the upper body structure of a vehicle in this configuration includes two load paths.

However, the roof reinforcement (tongue piece) is joined to the upper surface of the vehicle-width-direction inner side end of the roof rail outer in this configuration. Thus, the roof side rail is not directly supported from the vehicle-width-direction inner side (vehicle cabin side). In other words, the collision load is not directly received. This may lead to a failure to sufficiently reduce displacement of the roof side rail toward the vehicle-width-direction inner side in the event of a side collision of the vehicle.

SUMMARY

An upper body structure of a vehicle according to a first aspect includes: a pair of left and right roof side rails coupled to respective ends of a roof panel in a vehicle width direction, the pair of left and right roof side rails extending in a vehicle front-rear direction; and a roof reinforcement configured to couple intermediate portions in the vehicle front-rear direction of the pair of roof side rails in the vehicle width direction, wherein a vehicle-width-direction inner side end of each roof side rail is formed in a concave-convex shape in side view, a vehicle-width-direction outer side end of the roof reinforcement is formed in a concave-convex shape in side view, and the concave-convex shaped end of each roof side rail and the concave-convex shaped end of the roof reinforcement intersect in side view.

In the upper body structure of a vehicle described above, the vehicle-width-direction inner side end of the roof side rail is formed in a concave-convex shape in side view, and the vehicle-width-direction outer side end of the roof reinforcement is formed in a concave-convex shape in side view. This end shape can increase vehicle-width-direction rigidity of the roof side rail and the roof reinforcement.

The concave-convex shaped end of the roof side rail and the concave-convex shaped end of the roof reinforcement intersect with each other in side view. This allows the concave-convex shaped end of the roof side rail to be directly received by the concave-convex shaped end of the roof reinforcement in the event of a side collision of the vehicle, restraining displacement of the roof side rail toward the vehicle-width-direction inner side.

In the upper body structure of a vehicle of a second aspect, the roof reinforcement is joined to each of the roof side rails at a position near an intersecting point where the concave-convex shaped end of each roof side rail and the concave-convex shaped end of the roof reinforcement intersect with each other.

This configuration allows the concave-convex shaped end of the roof side rail to be immediately supported by the concave-convex shaped end of the roof reinforcement in the event of a side collision of the vehicle, whereby the collision load can be dispersed through the roof reinforcement.

In the upper body structure of a vehicle of a third aspect, one of each roof side rail and the roof reinforcement includes at least one protrusion extending to the other of each roof side rail and the roof reinforcement, and the at least one protrusion is joined to the other of each roof side rail and the roof reinforcement. This configuration allows for joining the roof side rail and the roof reinforcement simply while giving their ends a concave-convex shape.

In the upper body structure of a vehicle of a fourth aspect, each roof side rail includes a roof rail outer portion and a roof rail inner portion, the roof rail outer defining a vehicle-width-direction outer side wall, the roof rail inner defining, jointly with the roof rail outer portion, a closed cross-section extending in the vehicle front-rear direction, and the at least one protrusion extends from the vehicle-width-direction outer side end of the roof reinforcement and is joined to an upper surface of the roof rail outer. This configuration allows for joining the roof side rail and the roof reinforcement without involving a complicated structure.

In the upper body structure of a vehicle of a fifth aspect according to the fourth aspect, the at least one protrusion includes plural protrusions, and convex portions of the roof rail outer portion are joined to the roof panel. This configuration provides a large intersecting area and joining portions to be joined to the roof panel.

The upper body structure of a vehicle according to embodiments can reduce displacement of the roof side rail in the event of a side collision and thereby restrain the pillar from moving into the vehicle cabin.

DETAILED DESCRIPTION

Embodiments will be described below with reference to the drawings. The embodiments given below are merely exemplary in nature and are not intended to limit the present disclosure, its application, or uses.

An embodiment will be described below with reference to FIGS. 1 to 9. A vehicle V of the embodiment is a front engine rear drive (FR) vehicle that includes a vertically installed engine (not shown) in an engine compartment at the front of its vehicle cabin and has its rear wheels driven by the engine.

In the following description, an arrow F direction, an arrow L direction, and an arrow U direction in the figures represent a frontward direction in the vehicle front-rear direction, a leftward direction in the vehicle width direction, and an upward direction in the vehicle up-down direction, respectively. The vehicle V has a symmetric structure; accordingly, the following description mainly refers to components and portions on the right side of the vehicle V unless specifically noted.

Figure 1:
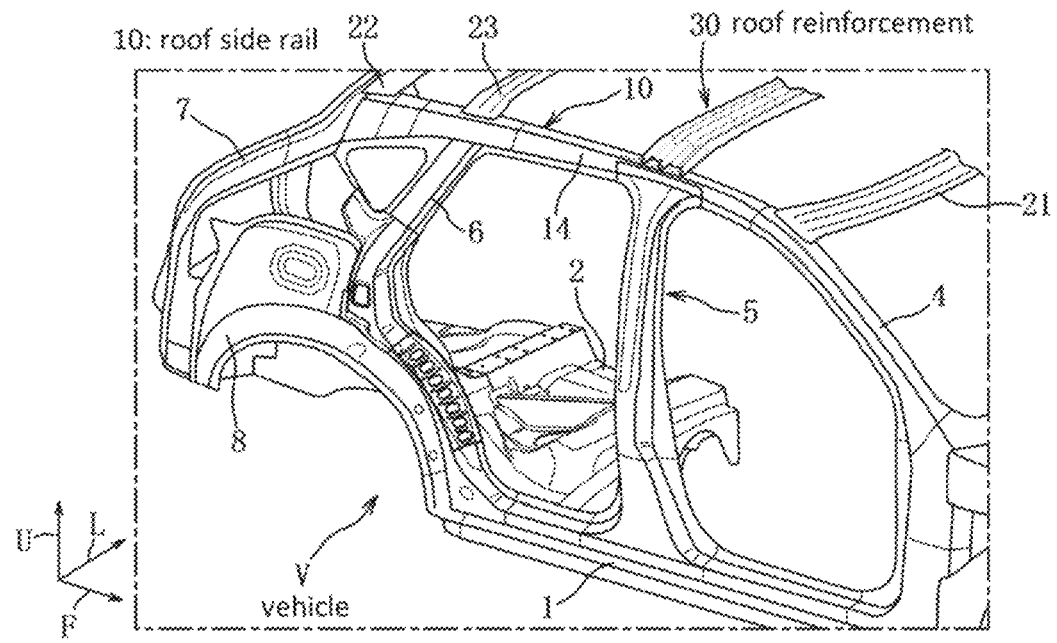
FIG. 1 is a perspective view of a vehicle-width-direction outer side of a vehicle of an embodiment.

First, a description will be given of an overall configuration. As shown in FIG. 1, the vehicle V includes: a pair of left and right side sills 1 extending in the front-rear direction; a floor panel 2 between the pair of side sills 1 and constituting a vehicle cabin floor; a pair of left and right roof side rails 10 extending in the front-rear direction and supporting a roof panel 3 (see FIG. 9); and pairs of left and right A to D pillars 4 to 7 each extending downward from the pair of roof side rails 10 to the pair of side sills 1 and spaced apart from the front to the rear in that order.

The side sill 1 includes an outer member and an inner member formed by pressing a steel plate. These outer and inner members jointly define a substantially linear closed-section extending in the front-rear direction.

A lower end of a hinge pillar, which corresponds to a lower half of the A pillar 4, is connected to a front end portion of the side sill 1. A lower end of the B pillar 5 is connected to an intermediate portion of the side sill 1. The A pillar 4, a front portion of the roof side rail 10, the B pillar 5, and a front portion of the side sill 1 define a door opening edge of a front door (not shown).

A front end portion of a rear wheel well 8 is connected to a rear end portion of the side sill 1. The B pillar 5, a rear portion of the roof side rail 10, the C pillar 6, a front portion of the rear wheel well 8, and a rear portion of the side sill 1 define a door opening edge of a rear door (not shown). The B pillar 5 is structured such that bending rigidity of its upper member corresponding to about two thirds from the upper end of the B pillar 5 is larger than bending rigidity of its lower member corresponding to about one third from the lower end of the B pillar 5.

As shown in FIG. 1, the pair of roof side rails 10 respectively correspond to left and right ends of the roof panel 3. The pair of roof side rails 10 include a pair of front and rear headers 21, 22, and two roof reinforcements 23, 30.

The front header 21 connects front ends of the pair of roof side rails 10, and the rear header 22 connects rear ends of the pair of roof side rails 10. The rear header 22 may be mounted with a pair of left and right hinges (not shown) for opening and closing a lift gate (not shown).

The roof reinforcement 23 connects portions associated with upper end portions of the pair of C pillars 6 in the left-right direction. The roof reinforcement 30 connects portions associated with upper end portions of the pair of B pillars 5 in the left-right direction.

Figure 2:
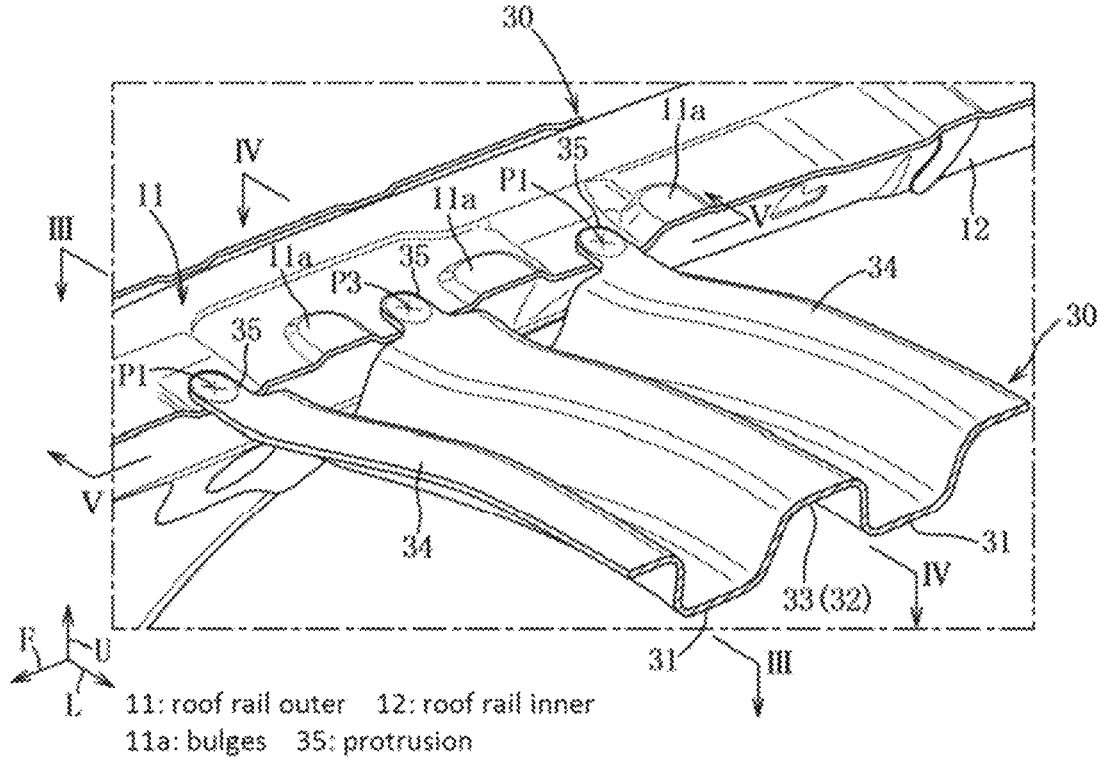
FIG. 2 is a perspective view of major parts of a roof side rail.
Figure 3:
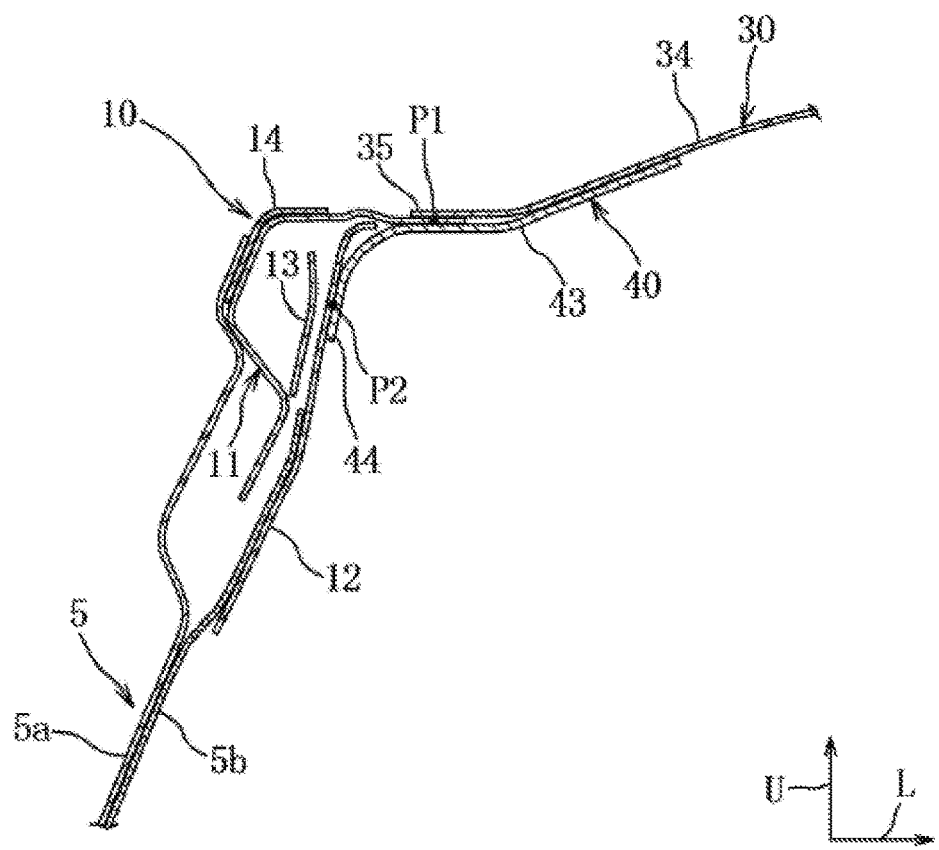
FIG. 3 is a sectional view taken along the line III-III of FIG. 2.
Figure 4:
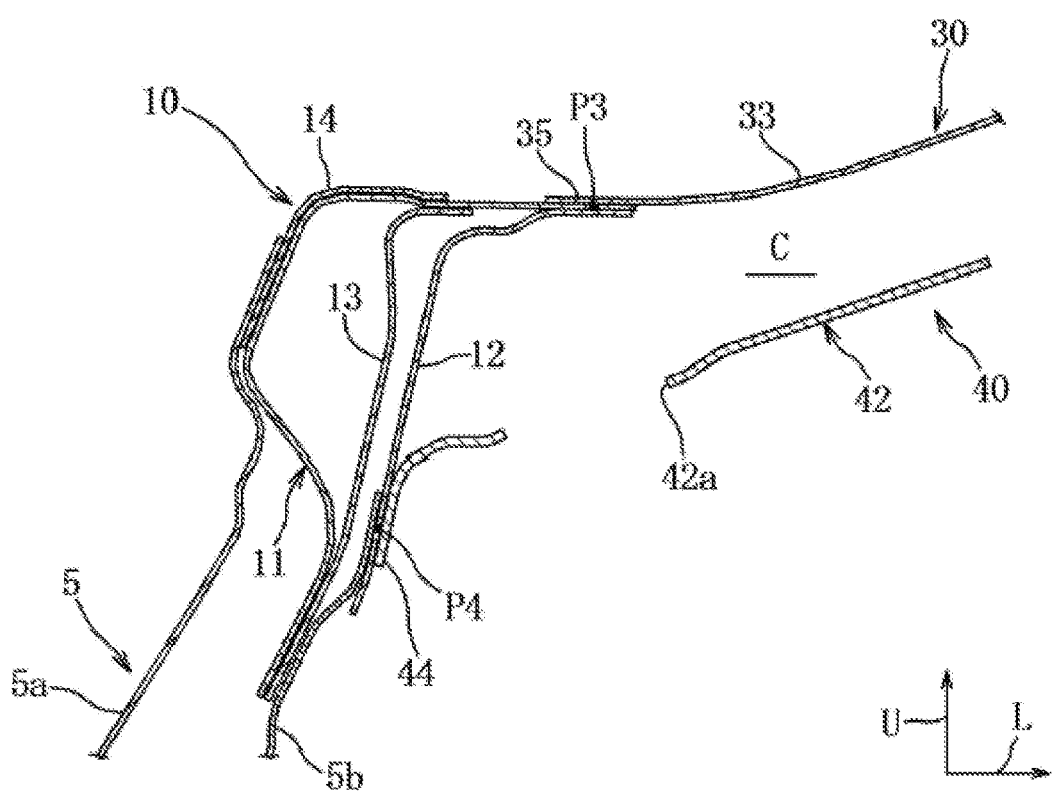
FIG. 4 is a sectional view taken along the line IV-IV of FIG. 2.

Now a description will be given of the roof side rail 10. As shown in FIGS. 2 to 4, the roof side rail 10 includes: a roof rail outer portion 11 constituting a right wall (vehicle-width-direction outer side wall); a roof rail inner portion 12 defining, jointly with the roof rail outer portion 11, a substantially trapezoidal closed cross-section extending in the front-rear direction; a roof rail reinforcement 13 partitioning the space within the trapezoidal closed cross-section into inside and outside portions; and a reinforcing member 14 having a substantially L-sectioned cross-section covering an upper ridge of the roof rail outer portion 11 extending in the front-rear direction.

A lower surface of an upper end of an outer member 5a of the B pillar 5 is joined to a central protruding region of an upper surface of the roof rail outer portion 11. Further, the reinforcing member 14 may be interposed between the outer member 5a and the roof rail outer portion 11, so that they are triple-joined. A lower end of the roof rail reinforcement 13 is interposed between a lower surface at a lower end of the roof rail outer portion 11 and an upper surface of an inner member 5b to be triple-joined, i.e., these portions overlap and are joined (see FIG. 4). The roof rail reinforcement 13 extends from the lower end of the roof rail outer portion 11 past the central protruding region thereof. An upper end of the roof rail reinforcement 13 is joined to the lower surface at an upper end of the roof rail outer portion 11.

Figure 5:
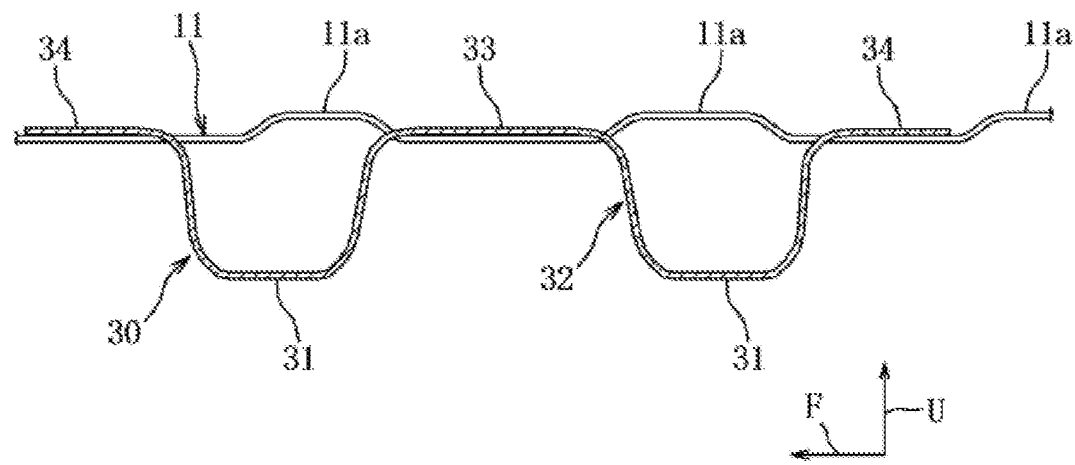
FIG. 5 is a sectional view taken along the line V-V of FIG. 2.
Figure 6:
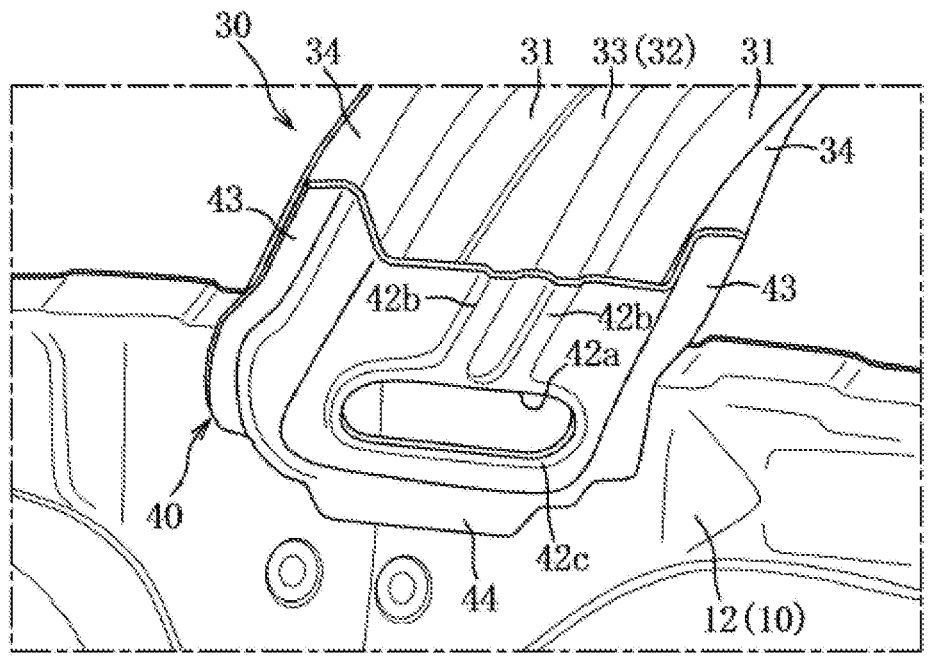
FIG. 6 is a perspective view of the roof side rail, a roof reinforcement, and a gusset when they are viewed from the left side of a vehicle cabin.

As shown in FIGS. 2 and 5, a left end (vehicle-width-direction inner side end) of the roof rail outer portion 11 is formed in a concave-convex shape (curved wave shape) in side view along a front-rear direction. The roof rail outer portion 11 has multiple bulges 11a arranged in the front-rear direction. The bulges 11a bulge upward relative to a reference surface that occupies most of the upper wall of the roof rail outer portion 11. These bulges 11a are joined, e.g., by welding and the like, to a bottom face of the roof panel 3. The roof reinforcement 30 is joined to the left end (vehicle-width-direction inner side end) of the roof rail outer portion 11.

Now a description will be given of the roof reinforcement 30. As shown in FIGS. 2 and 5, the roof reinforcement 30 is, e.g., integrally formed of a high tensile steel plate and includes: front and rear lower grooves 31 each having a substantially U-shaped cross-section; a connecting portion 33 connecting a rear upper end of the front lower groove 31 and a front upper end of the rear lower groove 31 to define an upper groove 32 having an inverted U-shaped cross-section; and a pair of front and rear flanges 34 respectively extending frontward from a front upper end of the front lower groove 31 and extending rearward from a rear upper end of the rear lower groove 31.

A right end of the roof reinforcement 30, namely right ends of the connecting portion 33 and the pair of front and rear flanges 34 face the left end (vehicle-width-direction inner side end) of the roof rail outer portion 11 with a slight gap in between.

The connecting portion 33 and the pair of front and rear flanges 34 include protrusions 35 extending rightward from their respective ends. Each protrusion 35 is present between two adjacent bulges 11a and joined, e.g., by welding and the like, to the upper surface (reference surface) of the roof rail outer portion 11.

As shown in FIG. 5, the concave-convex shaped left end (vehicle-width-direction inner side end) of the roof rail outer portion 11 and the concave-convex shaped right end of the roof reinforcement 30 intersect each other in a side view along the front-rear direction at least by an amount equal to the thickness of the roof rail outer portion 11. At positions where the bulges 11a are formed, the concave-convex shaped end of the roof reinforcement 30 intersects the cross-sections of the bulges 11a, forming a larger intersecting area than the thickness of the roof rail outer portion 11. In particular, the bulges 11a, e.g., the convex portions, substantially overlap with the grooves 31, e.g., concave portions, along the up-down direction to create a larger intersecting area. The roof rail outer portion 11 and the roof reinforcement 30 are joined at the concave portions of the roof rail outer portion 11 and the convex portions of the roof reinforcement 30. As may be seen in FIG. 5, the concave-convex end of the roof rail outer portion 11 and the concave-convex shaped right end of the roof reinforcement 30 have different concave and convex shapes from one another and are out of phase with one another.

As shown in FIGS. 6 to 9, a pair of left and right gussets 40 are at areas corresponding to the pair of B pillars 5. Each of the gussets 40 provides reinforcement between the corresponding roof side rail 10 and the roof reinforcement 30 from the vehicle cabin side. Each of the gussets 40 is, e.g., integrally formed of a high tensile steel plate with a substantially hat-shaped cross-section and includes: a pair of front and rear raised walls 41; a bottom wall 42 connecting lower ends of the pair of raised walls 41; a pair of front and rear upper flanges 43 respectively extending frontward from an upper end of the front raised wall 41 and extending rearward from an upper end of the rear raised wall 41; and a side flange 44 at a vehicle-width-direction outer side end of the gusset 40.

The bottom wall 42 includes, on the vehicle-width-direction outer side thereof, an elliptical opening 42a elongated in the front-rear direction. The bottom wall 42 further includes two front and rear beads 42b extending in the vehicle width direction and protruding downward, and an annular bead 42c extending along an outer periphery of the opening 42a and protruding downward. The two front and rear beads 42b are connected to the annular bead 42c. The opening 42a is a joining opening to allow joining, e.g., welding and the like, between the gusset 40, the roof reinforcement 30, the pillar 5, and the roof side rail 10.

Figure 7:
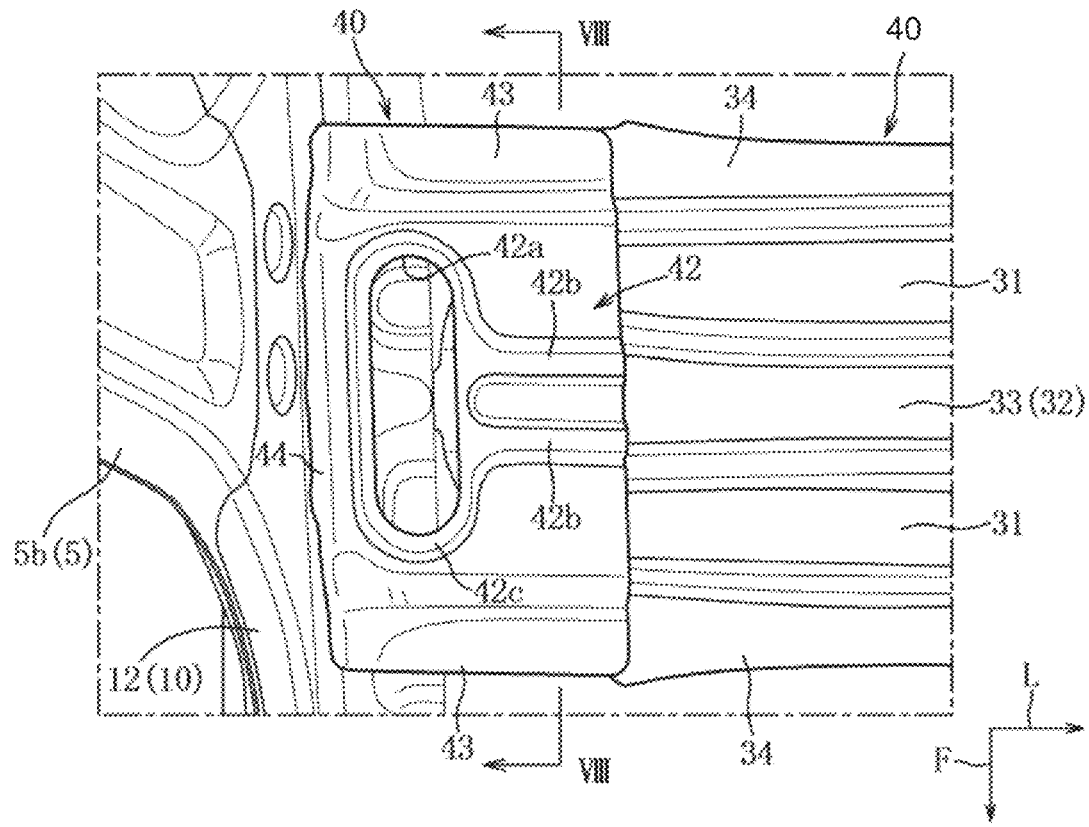
FIG. 7 is a plan view of the roof side rail, the roof reinforcement, and the gusset when they are viewed from the lower side in the vehicle cabin.

As shown in FIGS. 2 and 7, the right end of the roof reinforcement 30 extends along the left end (vehicle-width-direction inner side end) of the roof side rail 10 substantially in the front-rear direction with a slight gap in between. Accordingly, the beads 42b are substantially perpendicular to the right end of the roof reinforcement 30 in plan view.

Figure 8:
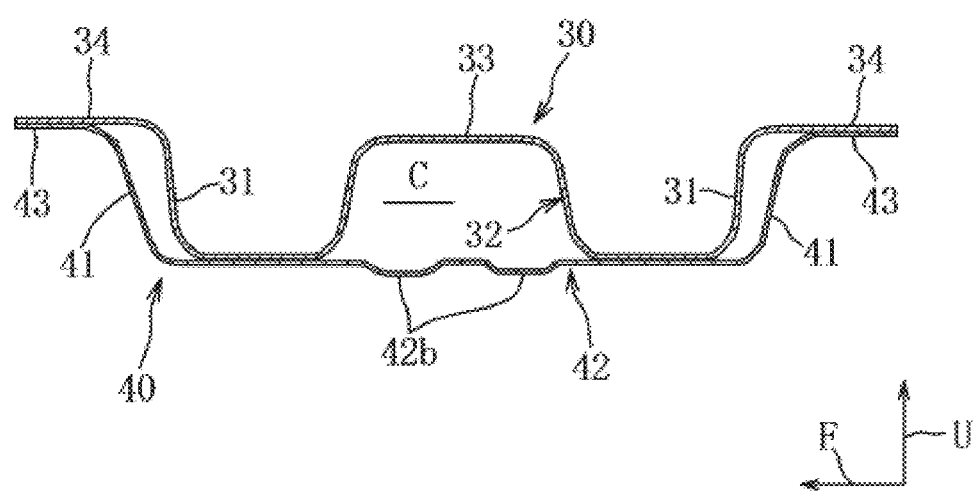
FIG. 8 is a sectional view taken along the line VIII-VIII of FIG. 7.
Figure 9:
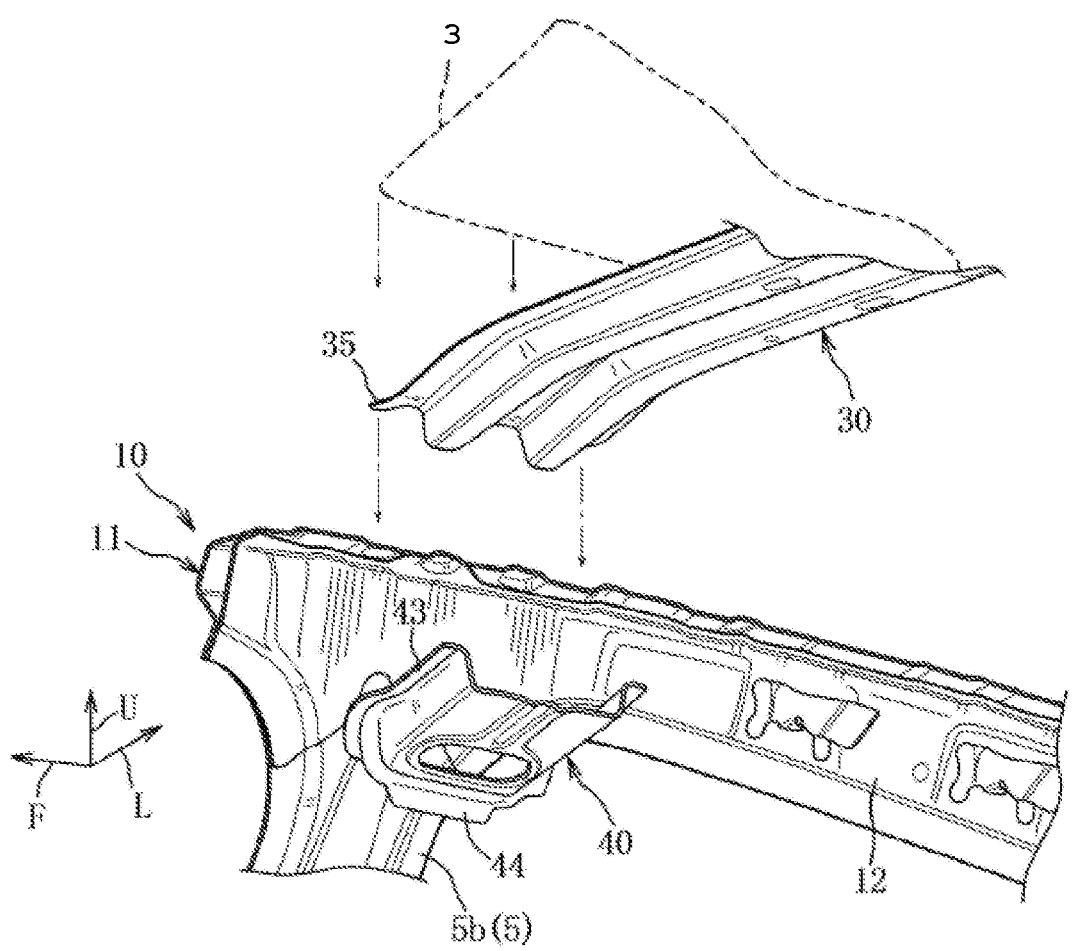
FIG. 9 is an exploded perspective view of the roof side rail, the roof reinforcement, and the gusset.
Figure 10:
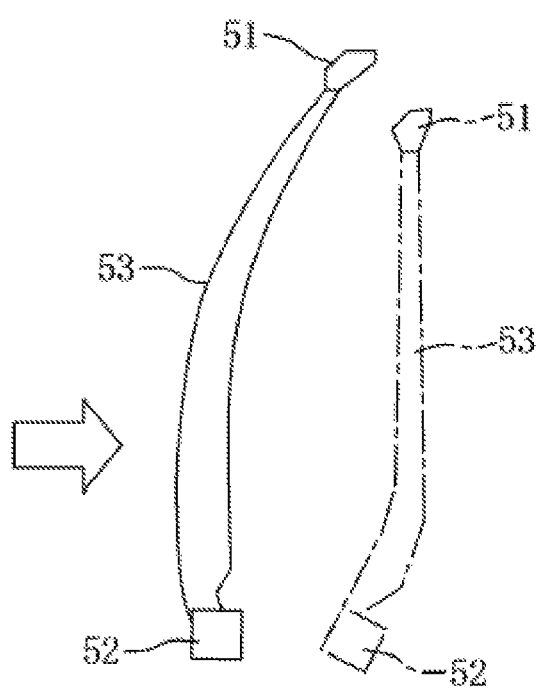
FIG. 10 explains displacement of a center pillar in the event of a side collision of the vehicle according to related art.

As shown in FIG. 8, the bottom wall 42 is joined to bottom walls of the front and rear lower grooves 31, and the pair of upper flanges 43 are respectively joined to the pair of flanges 34 (protrusions 35). The bottom wall 42 and the upper groove 32 define a substantially rectangular closed cross-section C extending across and below the roof side rail 10 and the roof reinforcement 30.

The beads 42b on the bottom wall 42 have a substantially trapezoidal cross-section protruding downward and include four ridges extending in the vehicle width direction. Thus, the beads 42b increase a sectional area of the closed cross-section C defined by the bottom wall 42 and the upper groove 32.

The roof side rail 10, the pillar 5, the roof reinforcement 30, and the gusset 40 are joined to each other at the first to the fourth joining portions P1 to P4.

The first and the second joining portions P1 and P2 are at positions corresponding to front and rear ends of the gusset 40. As shown in FIG. 3, at the first joining portion P1, the roof rail outer portion 11 is between the upper flange 43 and the protrusion 35 extending from the flange 34. The roof rail outer portion 11, the upper flange 43, and the protrusion 35 are triple-joined to each other, e.g., by welding and the like, at the first joining portion P1. At the second joining portion P2, which is on the vehicle-width-direction outer side relative to the first joining portion P1, the roof rail inner portion 12 and the side flange 44 are joined to each other, e.g., by welding and the like. In particular, a lower surface of the roof rail inner portion 12 and an upper surface of the side flange 44 are joined at the second joining portion P2.

The third and the fourth joining portions P3 and P4 are at positions corresponding to intermediate portions of the gusset 40 in the front-rear direction. As shown in FIG. 4, the roof rail inner portion 12 partially extends leftward. Thus, at the third joining portion P3, the roof rail outer portion 11 is interposed between the roof rail inner portion 12 and the protrusion 35 extending from the connecting portion 33. The roof rail outer portion 11, the roof rail inner portion 12, and the protrusion 35 are triple-joined to each other, e.g., by welding and the like. At the fourth joining portion P4, which is on the vehicle-width-direction outer side relative to the third joining portion P3, the roof rail inner portion 12 is interposed between the side flange 44 and an end of the inner member 5b of the column 5, and they are triple-joined to each other, e.g., by welding and the like.

In the present embodiment, the same joining method may be used to join the members at the first, second and fourth joining portions P1, P2, and P4. Further, the joining method to join the roof rail outer portion 11, the roof rail inner portion 12, and the roof reinforcement 30 at the third joining portion P3 may be the same as the joining method to join the members at the first, second and fourth joining portions P1, P2, and P4. This allows the joining to be done using the same station, helping to improve production efficiency.

Functions and effects of the above upper body structure will be described below.

In the upper body structure disclosed herein, the vehicle-width-direction inner side end of the roof side rail 10 is formed in a concave-convex shape in a side view along the front-rear direction, and the vehicle-width-direction outer side end of the roof reinforcement 30 is formed in a concave-convex shape in side view. This end shape can increase vehicle-width-direction rigidity of the roof side rail 10 and the roof reinforcement 30. The concave-convex shaped end of the roof side rail 10 and the concave-convex shaped end of the roof reinforcement 30 are disposed so as to intersect with each other in the side view. This allows the concave-convex shaped end of the roof side rail 10 to be directly received by the concave-convex shaped end of the roof reinforcement 30 in the event of a side collision of the vehicle V, restraining displacement of the roof side rail 10 toward the vehicle-width-direction inner side.

The roof reinforcement 30 is joined to the roof side rail 10 at positions near the intersecting points where the concave-convex shaped end of the roof side rail 10 and the concave-convex shaped end of the roof reinforcement 30 intersect each other. This allows the concave-convex shaped end of the roof side rail 10 to be immediately supported by the concave-convex shaped end of the roof reinforcement 30 in the event of a side collision of the vehicle V, whereby the collision load can be dispersed through the roof reinforcement 30.

One of the roof side rail 10 and the roof reinforcement 30 is provided with the protrusions 35 extending to the other of the roof side rail 10 and the roof reinforcement 30, and the protrusions 35 are joined to the other of the roof side rail 10 and the roof reinforcement 30, e.g., the protrusions 35 overlap the regions of the roof rail outer portion 11 between the bulges 11a along the up-down direction. This allows for simple joining between the roof side rail 10 and the roof reinforcement 30 while giving their ends a concave-convex shape.

The roof side rail 10 includes: the roof rail outer portion 11 that constitutes the vehicle-width-direction outer side wall of the roof side rail 10; and the roof rail inner portion 12 that defines, jointly with the roof rail outer portion 11, the closed cross-section extending in the front-rear direction. The protrusions 35 extend from the vehicle-width-direction outer side end of the roof reinforcement 30 and are joined to the upper surface of the roof rail outer portion 11. This allows the roof side rail 10 and the roof reinforcement 30 to be joined without involving a complicated structure.

Multiple protrusions 35 are provided, and the roof rail outer portion 11 includes the upward bulges 11a that are each present between the adjacent protrusions 35 and joined to the roof panel 3. This provides a large intersecting area while securing joining portions to be joined to the roof panel 3.

By way of summation and review, one or more embodiments described above provide an upper body structure of a vehicle that can reduce displacement of the roof side rail in the event of a side collision and thereby restrain the pillar from moving into the vehicle cabin.

Below a description will be given of a modification with some changes to the above embodiment.

(1) In the above embodiment, the roof reinforcement 30 is integrally formed; alternatively, the roof reinforcement 30 may be formed by joining multiple members. For example, the front lower groove 31 and the rear lower groove 31 may be separately prepared, and the connecting portion 33, which is a panel, may connect the front lower groove 31 and the rear lower groove 31. While the roof reinforcement 30 of the above embodiment includes the pair of front and rear lower grooves 31, the roof reinforcement 30 may include one lower groove 31 or three or more lower grooves 31. In this case, any number of protrusions 35 may be provided.

(2) Besides the above, those skilled in the art will readily understand that various modifications to the above embodiment and also a combination of embodiments are possible while keeping with the essential teaching of the present invention. The present invention encompasses these modifications and alterations.

REFERENCE SIGNS LIST

3 Roof panel
10 Roof side rail
11 Roof rail outer portion
11a Bulge
12 Roof rail inner portion
30 Roof reinforcement
35 Protrusion
V Vehicle

What is claimed is:

1. An upper body structure of a vehicle, the upper body structure comprising:
   a pair of left and right roof side rails coupled to respective ends of a roof panel in a vehicle width direction, the pair of let and right roof side rails extending in a vehicle front-rear direction; and
   a roof reinforcement that couples intermediate portions in the vehicle front-rear direction of the pair of roof side rails in the vehicle width direction,
   wherein a vehicle-width-direction inner side end of each roof side rail has bulges in a side view along the vehicle front-rear direction,
   a vehicle-width-direction outer side end of the roof reinforcement has a concave-convex shape in the side view, and
   the bulges in the roof side rail and the concave shapes in the roof reinforcement overlap in the up-down direction in the side view.

2. The upper body structure of a vehicle according to claim 1, wherein the roof reinforcement is joined to each of the roof side rails outside the bulges.

3. The upper body structure of a vehicle according to claim 1, wherein the bulges are joined to the roof panel.

4. The upper body structure of a vehicle according to claim 1, wherein the roof reinforcement includes at least one protrusion extending to the roof side rail, the at least one protrusion being between adjacent bulges.

* * * * *